US009767189B2

(12) United States Patent
Gilad et al.

(10) Patent No.: US 9,767,189 B2
(45) Date of Patent: Sep. 19, 2017

(54) CUSTOM ELECTRONIC MESSAGE PRESENTATION BASED ON ELECTRONIC MESSAGE CATEGORY

(71) Applicant: GOOGLE, INC., Mountain View, CA (US)

(72) Inventors: Itamar Gilad, Zurich (CH); Thompson Alexander Ivor Gawley, Palo Alto, CA (US); Andrew Ward Moedinger, Zurich (CH); Kevin Smilak, Mountain View, CA (US); Jeroen Daniël Jillissen, Zurich (CH); Jason Briggs Cornwell, Mountain View, CA (US); Balint Miklos, Zurich (CH)

(73) Assignee: Google Inc., Mountain View, CA (US)

( * ) Notice: Subject to any disclaimer, the term of this patent is extended or adjusted under 35 U.S.C. 154(b) by 375 days.

(21) Appl. No.: 14/229,737

(22) Filed: Mar. 28, 2014

(65) Prior Publication Data

US 2015/0186517 A1 Jul. 2, 2015

Related U.S. Application Data

(60) Provisional application No. 61/921,996, filed on Dec. 30, 2013.

(51) Int. Cl.
*G06F 17/30* (2006.01)
*H04L 12/58* (2006.01)

(52) U.S. Cl.
CPC ........ *G06F 17/30696* (2013.01); *H04L 51/16* (2013.01); *H04L 51/32* (2013.01)

(58) Field of Classification Search
CPC ......... G06F 17/30867; G06F 17/30554; G06F 17/30864; G06F 17/30483;
(Continued)

(56) References Cited

U.S. PATENT DOCUMENTS 4,914,650 A   4/1990  Sriram
5,948,040 A   9/1999  DeLorme et al.
(Continued)

OTHER PUBLICATIONS

Cohen, Learning Rules that classify E-mail, Feb. 22, 2002, 8 pgs.
(Continued)

*Primary Examiner* — Monica Pyo
(74) *Attorney, Agent, or Firm* — Morgan, Lewis & Bockius LLP

(57) ABSTRACT

System and methods are provided for performing a method, for instance, at a computer system having one or more processors and memory storing one or more programs for execution by the one or more processors. In the method a search query is received. The search query identifies a message category from among a plurality of message categories. Each respective message category in the plurality of message categories corresponds to an electronic message display format in a plurality of electronic message display formats. Responsive to the search query, a search result comprising one or more electronic messages satisfying the search query is identified. The one or more electronic messages are prepared for display by formatting for display a first electronic message, in the one or more electronic messages, associated with the first message category. The formatting makes use of the electronic message display format that corresponds to the first message category.

12 Claims, 14 Drawing Sheets

(58) Field of Classification Search
CPC ......... G06F 17/30528; G06F 17/30598; G06F 17/30675; G06F 17/30401; G06F 17/30415
USPC .............................. 707/722, 728, 731, 732
See application file for complete search history.

(56) References Cited

U.S. PATENT DOCUMENTS

| | | | |
|---|---|---|---|
| 5,948,058 A | 9/1999 | Kudoh et al. | |
| 6,044,260 A | 3/2000 | Eaton et al. | |
| 6,057,841 A | 5/2000 | Thurlow et al. | |
| 6,147,977 A | 11/2000 | Thro et al. | |
| 6,232,972 B1 | 5/2001 | Arcuri et al. | |
| 6,252,597 B1 | 6/2001 | Lokuge | |
| 6,333,973 B1 | 12/2001 | Smith et al. | |
| 6,351,764 B1 | 2/2002 | Voticky et al. | |
| 6,421,709 B1 | 7/2002 | McCormick et al. | |
| 6,507,866 B1 | 1/2003 | Barchi | |
| 6,700,591 B1 | 3/2004 | Sharpe | |
| 6,704,772 B1 | 3/2004 | Ahmed et al. | |
| 6,725,228 B1 | 4/2004 | Clark et al. | |
| 6,778,642 B1 | 8/2004 | Schmidt, Jr. et al. | |
| 6,961,341 B1 | 11/2005 | Krishnan | |
| 7,120,865 B1 | 10/2006 | Horvitz et al. | |
| 7,167,910 B2 | 1/2007 | Farnham et al. | |
| 7,194,516 B2 | 3/2007 | Giacobbe et al. | |
| 7,359,947 B2 | 4/2008 | Kelley et al. | |
| 7,386,535 B1 | 6/2008 | Kalucha et al. | |
| 7,415,504 B2 | 8/2008 | Schiavone et al. | |
| 7,421,690 B2 | 9/2008 | Forstall et al. | |
| 7,429,993 B2 | 9/2008 | Hui | |
| 7,475,120 B1 | 1/2009 | Ngo et al. | |
| 7,506,263 B1 | 3/2009 | Johnston et al. | |
| 7,536,652 B2 | 5/2009 | Uemura et al. | |
| 7,539,732 B2 | 5/2009 | Kelso et al. | |
| 7,568,011 B2 | 7/2009 | Bocking et al. | |
| 7,689,656 B2 | 3/2010 | McCarthy et al. | |
| 7,707,255 B2 * | 4/2010 | Satterfield ............ | G06Q 10/107 709/206 |
| 7,730,137 B1 | 6/2010 | Toomey | |
| 7,765,212 B2 | 7/2010 | Surendran et al. | |
| 7,788,329 B2 | 8/2010 | Barrett et al. | |
| 7,814,155 B2 | 10/2010 | Buchheit et al. | |
| 7,895,279 B2 | 2/2011 | Forstall et al. | |
| 7,895,537 B2 | 2/2011 | Gruen et al. | |
| 7,958,099 B2 | 6/2011 | Kang et al. | |
| 7,979,501 B1 | 7/2011 | Coleman et al. | |
| 7,996,900 B2 | 8/2011 | Gillum et al. | |
| 8,010,613 B2 | 8/2011 | Oral et al. | |
| 8,031,845 B2 | 10/2011 | Gruen et al. | |
| 8,041,745 B2 | 10/2011 | Newton et al. | |
| 8,065,369 B2 | 11/2011 | Turski et al. | |
| 8,095,400 B2 | 1/2012 | Herde et al. | |
| 8,108,469 B2 | 1/2012 | Kent, Jr. et al. | |
| 8,140,703 B2 | 3/2012 | Morris et al. | |
| 8,150,926 B2 | 4/2012 | Sundararajan et al. | |
| 8,150,930 B2 | 4/2012 | Satterfield et al. | |
| 8,176,130 B2 | 5/2012 | Daniell | |
| 8,224,902 B1 | 7/2012 | Glasser et al. | |
| 8,230,350 B2 | 7/2012 | Dodsworth | |
| 8,233,885 B2 | 7/2012 | Kansal et al. | |
| 8,239,874 B2 | 8/2012 | Anderson et al. | |
| 8,281,382 B1 | 10/2012 | Sanyal et al. | |
| 8,286,089 B2 | 10/2012 | Hardy et al. | |
| 8,307,029 B2 | 11/2012 | Davis et al. | |
| 8,375,307 B2 | 2/2013 | Kim | |
| 8,375,400 B2 | 2/2013 | Sutedja et al. | |
| 8,402,096 B2 | 3/2013 | Affronti et al. | |
| 8,448,084 B2 | 5/2013 | Brichter | |
| 8,499,042 B2 | 7/2013 | Brown et al. | |
| 8,499,048 B2 | 7/2013 | Malik et al. | |
| 8,533,274 B2 | 9/2013 | Buchheit et al. | |
| 8,560,619 B1 | 10/2013 | Huston et al. | |
| 8,572,277 B2 | 10/2013 | Morris et al. | |
| 8,577,967 B1 | 11/2013 | Chavez et al. | |
| 8,583,747 B2 | 11/2013 | Buchheit et al. | |
| 8,626,851 B2 | 1/2014 | Buchheit et al. | |
| 8,656,289 B1 | 2/2014 | Dodsworth | |
| 8,701,018 B1 | 4/2014 | Keel et al. | |
| 2002/0143871 A1 | 10/2002 | Meyer et al. | |
| 2002/0160757 A1 | 10/2002 | Shavit et al. | |
| 2003/0020749 A1 | 1/2003 | Abu-Hakima et al. | |
| 2003/0154212 A1 | 8/2003 | Schirmer et al. | |
| 2003/0177190 A1 | 9/2003 | Moody et al. | |
| 2003/0195811 A1 | 10/2003 | Hayes, Jr. et al. | |
| 2003/0214534 A1 | 11/2003 | Uemura et al. | |
| 2003/0233419 A1 | 12/2003 | Beringer | |
| 2004/0078190 A1 | 4/2004 | Fass et al. | |
| 2004/0153456 A1 | 8/2004 | Charnock et al. | |
| 2004/0199529 A1 | 10/2004 | Clark et al. | |
| 2004/0254998 A1 | 12/2004 | Horvitz | |
| 2005/0004990 A1 | 1/2005 | Durazo et al. | |
| 2005/0018819 A1 | 1/2005 | Schmidt et al. | |
| 2005/0080851 A1 | 4/2005 | Kent, Jr. et al. | |
| 2005/0080862 A1 | 4/2005 | Kent, Jr. et al. | |
| 2005/0102366 A1 | 5/2005 | Kirsch | |
| 2005/0114781 A1 | 5/2005 | Brownholtz et al. | |
| 2005/0138552 A1 | 6/2005 | Venolia | |
| 2005/0193076 A1 | 9/2005 | Flury et al. | |
| 2005/0193345 A1 | 9/2005 | Klassen et al. | |
| 2005/0228790 A1 | 10/2005 | Ronnewinkel et al. | |
| 2005/0246658 A1 | 11/2005 | Uemura et al. | |
| 2005/0256968 A1 | 11/2005 | Johnson | |
| 2006/0010215 A1 | 1/2006 | Clegg et al. | |
| 2006/0031340 A1 | 2/2006 | Mathew et al. | |
| 2006/0031347 A1 | 2/2006 | Sahi | |
| 2006/0059238 A1 | 3/2006 | Slater et al. | |
| 2006/0064410 A1 | 3/2006 | Razza et al. | |
| 2006/0069734 A1 | 3/2006 | Gersh et al. | |
| 2006/0075044 A1 | 4/2006 | Fox et al. | |
| 2006/0095466 A1 | 5/2006 | Stevens et al. | |
| 2006/0123360 A1 | 6/2006 | Anwar et al. | |
| 2006/0173824 A1 | 8/2006 | Bensky et al. | |
| 2006/0173961 A1 | 8/2006 | Turski et al. | |
| 2006/0206495 A1 | 9/2006 | Van Gageldonk et al. | |
| 2006/0277504 A1 | 12/2006 | Zinn | |
| 2007/0005592 A1 | 1/2007 | Kender et al. | |
| 2007/0038718 A1 * | 2/2007 | Khoo ................... | G06Q 10/107 709/206 |
| 2007/0106729 A1 | 5/2007 | Adams et al. | |
| 2007/0156669 A1 | 7/2007 | Marchisio et al. | |
| 2007/0262861 A1 | 11/2007 | Anderson et al. | |
| 2007/0277113 A1 | 11/2007 | Agrawal et al. | |
| 2007/0299923 A1 | 12/2007 | Skelly et al. | |
| 2008/0215687 A1 | 9/2008 | Madnani | |
| 2009/0089798 A1 | 4/2009 | Anderson et al. | |
| 2010/0030798 A1 | 2/2010 | Kumar et al. | |
| 2010/0049806 A1 | 2/2010 | Haynes et al. | |
| 2010/0056221 A1 | 3/2010 | Park | |
| 2010/0114855 A1 | 5/2010 | Li et al. | |
| 2010/0199180 A1 | 8/2010 | Brichter | |
| 2010/0262922 A1 | 10/2010 | Fan et al. | |
| 2010/0278453 A1 | 11/2010 | King | |
| 2010/0306249 A1 * | 12/2010 | Hill ................... | G06F 17/30867 707/769 |
| 2011/0010182 A1 | 1/2011 | Turski et al. | |
| 2011/0072363 A1 | 3/2011 | Mandel et al. | |
| 2011/0231499 A1 | 9/2011 | Stovicek et al. | |
| 2011/0289106 A1 | 11/2011 | Rankin, Jr. et al. | |
| 2012/0102037 A1 | 4/2012 | Ozonat | |
| 2012/0131095 A1 | 5/2012 | Luna et al. | |
| 2012/0180021 A1 | 7/2012 | Byrd et al. | |
| 2012/0185781 A1 | 7/2012 | Guzman et al. | |
| 2012/0185797 A1 | 7/2012 | Thorsen et al. | |
| 2012/0198053 A1 | 8/2012 | Ozhan et al. | |
| 2012/0204191 A1 | 8/2012 | Shia et al. | |
| 2012/0210334 A1 | 8/2012 | Sutedja et al. | |
| 2012/0271908 A1 | 10/2012 | Luna et al. | |
| 2012/0272160 A1 | 10/2012 | Spivack et al. | |
| 2013/0024440 A1 | 1/2013 | Dimassimo et al. | |
| 2013/0055099 A1 | 2/2013 | Yao et al. | |
| 2013/0110953 A1 | 5/2013 | Sutedja et al. | |
| 2013/0159879 A1 | 6/2013 | Affronti et al. | |
| 2013/0165165 A1 | 6/2013 | Macek et al. | |

(56) References Cited

U.S. PATENT DOCUMENTS

| | | |
|---|---|---|
| 2013/0166280 A1 | 6/2013 | Quast et al. |
| 2013/0212189 A1 | 8/2013 | Velissarakos |
| 2013/0297604 A1 | 11/2013 | Sutedja et al. |
| 2013/0305187 A1 | 11/2013 | Phillips et al. |
| 2013/0325705 A1 | 12/2013 | Laird et al. |
| 2013/0332850 A1 | 12/2013 | Bovet et al. |
| 2014/0052797 A1 | 2/2014 | Lessard et al. |
| 2014/0096032 A1 | 4/2014 | Mayblum et al. |
| 2014/0096033 A1 | 4/2014 | Blair |
| 2014/0115495 A1 | 4/2014 | Wetherell et al. |
| 2014/0279016 A1 | 9/2014 | Capel et al. |
| 2014/0280619 A1 | 9/2014 | Banatwala et al. |
| 2014/0280635 A1 | 9/2014 | Bengochea et al. |
| 2014/0344711 A1 | 11/2014 | Hallerstrom Sjostedt et al. |
| 2014/0359480 A1 | 12/2014 | Vellal et al. |
| 2015/0088784 A1 | 3/2015 | Dhara et al. |

OTHER PUBLICATIONS

Soni, "An automatic email mining approach using semantic non-parametric K-means++ clustering", May 2013, 104 pgs.

Kandogan et al., "Avatar Semantic Search: A Database Approach to Information Retrieval", 2006, 3 pgs.

\* cited by examiner

CUSTOM ELECTRONIC MESSAGE PRESENTATION BASED ON ELECTRONIC MESSAGE CATEGORY

CROSS REFERENCE TO RELATED APPLICATION

This application claims priority to U.S. Patent Application No. 61/921,996, filed Dec. 30, 2014, which is hereby incorporated by reference herein in its entirety.

TECHNICAL FIELD

The implementations disclosed herein relate generally to display of electronic messages on a user interface.

BACKGROUND

The typical user of an email application receives many electronic messages a day. For ease of reference, it may be preferred that messages containing a particular type of content (e.g., emails relating to travels, such as rental car bookings, flight tickets, and hotel reservations) are automatically organized and retrievable together, even though these messages themselves do not appear related to one another. As an example, users often like to have messages relating to social network updates (e.g., Jane, a law school friend, recently joined a social networking group for young alumni; and Tim, a co-worker, has just published a vacation photo on his social networking website), grouped together and visually presented together after performing a search for such messages.

Problems exist with offering such a feature, however. One problem is that presenting search results in a generic format causes some pertinent information to be diminished. For example, displaying "Travel" emails in response to a search query for such messages, and listing them in a generic fashion so that the user cannot quickly see the prices for hotels or flights of interest. Another problem is that a user may wish to view search results differently, depending on the content of the electronic messages (e.g., to view social network posts differently from newsletters).

The above identified technical problems are reduced or eliminated by the systems and methods disclosed herein.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

SUMMARY

Figure 1:
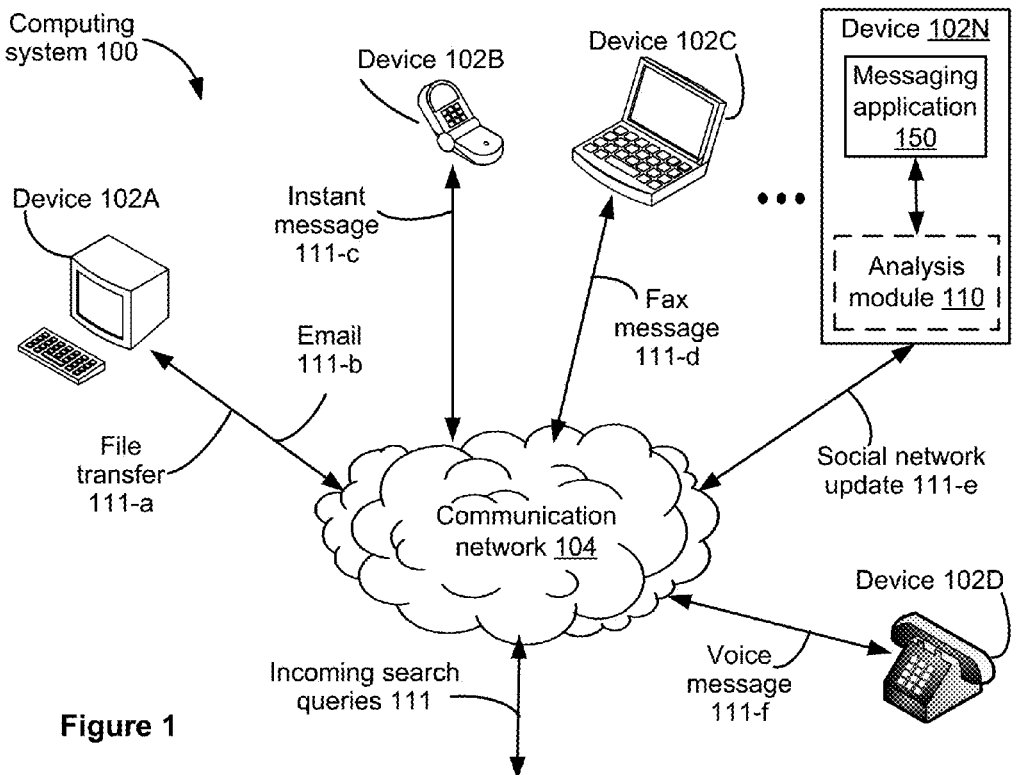
FIG. 1 is an example block diagram illustrating a computing system, in accordance with some implementations.
Figure 1:
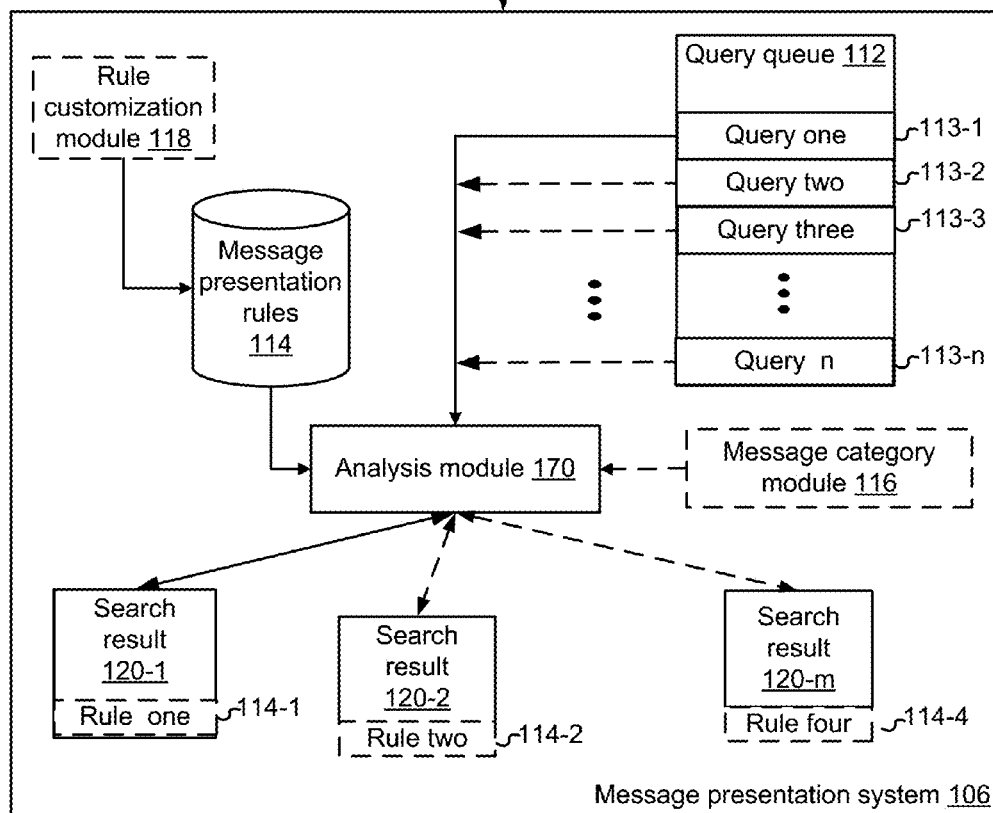

Technical solutions (e.g., computing systems, methods, and non-transitory computer readable storage mediums) for presenting electronic messages are provided in the present application.

In some implementations, a method is performed at a computer system having one or more processors and memory storing one or more programs for execution by the one or more processors. The method includes receiving a search query identifying a first message category from among a plurality of message categories, where each respective message category in the plurality of message categories corresponds to an electronic message display format in a plurality of electronic message display formats. The method further includes, identifying, responsive to the search query, a search result, where the search result comprises one or more electronic messages that satisfy the query. The method includes preparing the one or more electronic messages for display. The preparing comprises formatting for display a first electronic message in the one or more electronic messages, where the first electronic message is associated with the first message category, using the electronic message display format that corresponds to the first message category.

In some implementations, the search result includes a message cluster. A message cluster is one or more electronic messages having a collective association. In some implementations, the first electronic message is in the message cluster, and the message cluster includes one or more other electronic messages in the plurality of electronic messages. In some embodiments, the preparing further comprises formatting the message cluster for display as a first single cluster graphic. In some embodiments, the method includes, responsive to a predefined user action in connection with the first single cluster graphic, expanding display of the first single cluster graphic by, while maintaining display of information representing the electronic messages in the message cluster, formatting for display content of the first electronic message in accordance with the display format that corresponds to the first message category. In some implementations, the first electronic message and the one or more other messages are clustered into the message cluster without regard to content relatedness between electronic messages. In some implementations, the message cluster and all the electronic messages in the message cluster are associated with the first message category.

In some implementations, the search query comprises a search expression entered by a user and the identifying comprises determining the first message category from the search expression. In other embodiments, the first message category is identified by other means. For example, in some embodiments, in addition to the search query, the user provides or selects the message category from among the plurality of available message categories. In some embodiments, the search query is the message category itself.

In some implementations, a single electronic message can be associated with more than one message category in the plurality of message categories. As such, in some implementations, the first electronic message described above is further associated with a second message category in the plurality of message categories.

In some implementations, the first message category is "promotions" and the first electronic message display format specifies graphical depiction of a product referenced in an electronic message. In such implementations, the formatting comprises including a first graphical depiction of a product referenced in the first electronic message in accordance with the first electronic message display format. In some implementations, the first graphical depiction is obtained from a source other than the first electronic message. For example, in some embodiments there is an external or internal database providing graphical depictions of products and the graphical depiction of the product is obtained from this external or internal database in accordance with the first electronic message display format.

In some implementations, the first message category is "promotions" and the first electronic message display format specifies that a price of a product referenced in an electronic message be depicted. In such implementations, the formatting comprises including a price of a product referenced in the first electronic message in accordance with the first electronic message display format. In some implementations, the price is obtained from a source other than the first electronic message. For example, in some embodiments there is an external or internal database providing the prices of products and the price of the product referenced in the first electronic message is obtained from this external or internal database in accordance with the first electronic message display format.

In some implementations, the first message category is "social" and the first electronic message display format specifies graphical depiction of a person referenced in the electronic message. In such implementations, the formatting comprises including a first graphical depiction of a person referenced in the first electronic message in accordance with the first electronic message display format. In some implementations, the first graphical depiction is obtained from a source other than the first electronic message. For example, in some embodiments there is an external or internal database providing the images of people and the first graphical depiction of a person referenced in the first electronic message is obtained from this external or internal database in accordance with the first electronic message display format.

In some implementations, the plurality of message categories comprises one or more (i) a personal electronic message category, (ii) a social electronic message category, (iii) a promotions electronic message category, (iv) an updates electronic message category, and (v) a forums electronic message category. In some implementations, the plurality of message categories comprises two or more (i) a personal electronic message category, (ii) a social electronic message category, (iii) a promotions electronic message category, (iv) an updates electronic message category, and (v) a forums electronic message category. In some implementations, the plurality of message categories comprises three or more (i) a personal electronic message category, (ii) a social electronic message category, (iii) a promotions electronic message category, (iv) an updates electronic message category, and (v) a forums electronic message category. In some implementations, the plurality of message categories comprises four or more (i) a personal electronic message category, (ii) a social electronic message category, (iii) a promotions electronic message category, (iv) an updates electronic message category, and (v) a forums electronic message category. In some implementations, the plurality of message categories comprises (i) a personal electronic message category, (ii) a social electronic message category, (iii) a promotions electronic message category, (iv) an updates electronic message category, and (v) a forums electronic message category. In some implementations, the plurality of message categories consists of (i) a personal electronic message category, (ii) a social electronic message category, (iii) a promotions electronic message category, (iv) an updates electronic message category, and (v) a forums electronic message category. In some implementations, the user is able to create custom message categories. In some implementations, the user is not able to create custom message categories.

In other aspects of the present disclosure, computing systems and non-transitory computer storage mediums for executing one or more steps of any of the above-described methods or any of the methods disclosed herein are also disclosed.

DETAILED DESCRIPTION

The implementations described herein provide various technical solutions to improve display of electronic messages, and in particular to the above-identified problems, by providing techniques for displaying the results of search queries in ways that convey pertinent information. Details of implementations are now described in relation to the Figures.

FIG. 1 is a block diagram illustrating a computing system 100, in accordance with some implementations.

In some implementations, the computing system 100 includes one or more devices 102 (e.g., device 102A, 102B, 102C, 102D ..., and 102N), a communication network 104, and a message presentation system 106. In some implementations, a device 102 is a phone (mobile or landline, smart phone or otherwise), a tablet, a computer (mobile or otherwise), a fax machine, or an audio/video recorder.

In some implementations, a device 102 obtains a search query from a user of the device 102, and transmits the search query to the message presentation system 106 for generating the corresponding display format. For example, after determining that user Jack wishes to view "Social Network Updates", the device 102 transmits the search query to the message presentation system 106, which generates a display format for electronic messages that are deemed to satisfy the search query.

In some implementations, an incoming search query 111 is message-based, such as a search query for a file transfer 111-a (e.g., a photo, document, or video download/upload), an email 111-b, an instant message 111-c, a fax message 111-d, a social network update 111-e, or a voice message 111-f.

In some implementations, a device 102 includes a messaging application 150 and optionally an analysis module 110 (similar to the analysis module 170 included in the message presentation system 106). In some implementations, the messaging application 150 processes incoming and outgoing electronic messages into and from the device 102, such as an outgoing email sent by a user of the device 102 to another user, and a chat message by another user to a user of the device 102. In some implementations, the analysis module 110 resident on the device 102 balances processing load with the analysis module 170 resident on the message presentation system 106.

In some implementations, the communication network 104 interconnects one or more devices 102 with each other, and with the message presentation system 106. In some implementations, the communication network 104 optionally includes the Internet, one or more local area networks (LANs), one or more wide area networks (WANs), other types of networks, or a combination of such networks.

In some implementations, the message presentation system 106 includes an analysis module 170, a query queue 112, a collection of message presentation rules 114 (e.g., user or system-provided rules), and optionally a rule customization module 118.

As a non-limiting example, a message presentation system 106 analyzes incoming search queries 111, such as a request to see all messages or message clusters of a certain category, where a message cluster is one or more electronic messages having a collective, content-based association (e.g., a "Promotions" cluster of promotional emails, or a "Social Network" cluster of social network posts) and a common message type. In some instances, incoming search queries 111 get queued up for analysis by analysis module 170 of the message presentation system 106, in query queue 112.

In some embodiments, starting with Query One 113-1, the message presentation system 106 identifies one or more electronic messages (e.g., search result 120-1) that are deemed to satisfy Query One 113-1. In some cases, the analysis module 170 identifies the respective message category corresponding to each electronic message in the respective search result. In some cases, each electronic message in the respective search result is in the same category (e.g., in embodiments where the search query is the category itself). In some cases, the message category information, along with corresponding message presentation information (e.g., which of message presentation rules 114 to apply), associated with each message category, is stored and updated in message category module 116. In some embodiments, all of the messages in the search result are in the same message category (e.g., in embodiments where the search query was the category itself). In some embodiments message category module 116 determines a message category of the search query and requires that all messages in the search result be of this same category. In some embodiments a message category of the search query is not determined and a first electronic message in the search result is of a first message category and a second electronic message in the search result is of a second message category (e.g., a user enters a search expression that results in the identification of multiple electronic messages, which satisfy the search expression, from multiple different categories).

In some embodiments, an electronic message in the search result is associated with a plurality of message categories and the search query is associated with a message category (e.g., the search query was a message category itself or the user or system 106 imposed a requirement that the query be limited to a message category). In such embodiments, the message category of the query is used to format the electronic message even when the electronic message is associated with a plurality of message categories.

In some embodiments, an electronic message in the search result is associated with a plurality of message categories and the search query does not impose a limitation on the search query category. In such embodiments, hierarchical rules among the message categories are used to determine which of the message categories' electronic display formats is to be used to format the electronic message. For example, consider the case in which a first electronic message in the search result is associated with a first and second message category. Consider further that the first message category includes or is controlled by logic that specifies that the first message category takes precedence over the second message category. Because of this logic, the electronic display format associated with the second message category is not used for formatting electronic messages associated with the second category when such electronic messages are also associated with the first category. As a result, in this example, the electronic message display format associated with the first message category is used to format the first electronic message. Referring to the computing system 100 of FIG. 1, in some embodiments, the electronic message display format is coded as one or more message presentation rules 114 as further described below.

In some cases, in which the query specifies the message category, after message presentation system 106 analyzes a search query and determines the corresponding search results (e.g., messages), analysis module 170 determines which one or more message presentation rules 114 to apply to the respective search results, based on the message category of the search query. The one or more message presentation rules 114 constitute the message display format for the message category. For example, consider the case in which Query One 113-1 corresponds to search result 120-1. Analysis module 170 applies the electronic message display format that corresponds to the message category (e.g. message presentation Rule One 114-1) to the electronic messages of search result 120-1.

In some cases, in which the query imposes no limitations on the specific message category necessary for the search results, after message presentation system 106 analyzes the search query and determines the corresponding search results (e.g., electronic messages that are deemed to satisfy the search query) and their respective message categories, analysis module 170 determines which one or more message presentation rules 114 to apply to the respective search results, based on the message categories of the search results. For example, consider the case in which Query One 113-1 corresponds to search result 120-1, and search results 120-1 has a first electronic message in a first message category and a second electronic message in a second category. Analysis module 170 applies the message presentation rules 114 applicable to the first message category to the first electronic message and the message presentation rules 114 applicable to the second message category to the second electronic message. The message presentation rules 114 applicable to a given message category are deemed to be the electronic message display format for that given message category.

In some embodiments, there is one or more message presentation rules 114 for a given electronic message display format. In some embodiments, there are two or more message presentation rules 114 for a given electronic message display format. In some cases, the same message presentation rule is applied to more than one search result category (e.g., a search result for "Travel" and a search result for "Promotions"). In some cases, a search result of a particular type (e.g., a travel category) is automatically assigned one or more message presentation rules 114 by the system 106 upon generation of the search result. In some cases, one or more of the message presentation rules 114 are user-generated, using rule customization module 118. In some cases, the one or more user-generated rules are created for only one particular search result category, while in some cases the one or more user-generated rules can be applied to more than one search result category. In some cases, there is one default message presentation rule for all search results, or for all search results of a particular category. In some cases more than one message presentation rule is applied to a respective search result. In some cases one message presentation rule has superseding authority over all other message presentation rules in message presentation system 106.

In some implementations, the analysis module 110 is a software or hardware component resident on the device 102, such as a software package/application or a hardware chipset, for generating display of electronic messages, and analysis module 170 on server 106 is not used. In some implementations, the analysis module 110 is not present and analysis module 170, which exists separate from or independent of the device 102 is used (e.g., a e-mail message presentation/processing server that is connected with but not part of the device 102, e.g., in the manner depicted in FIG. 1 with analysis module 170). In still other implementations, the analysis module 110 is a software or hardware component resident on the device 102, such as a software package/application or a hardware chipset, for generating display of electronic messages, and analysis module 170 on server 106 is also used. That is, both analysis module 110 on device 102 and analysis module 170 on server 106 are used. For instance, in some such embodiments some presentation rules 114 (e.g. user-specified rules) are implemented on device 102 and implemented using analysis module 110 and some presentation rules 114 (e.g., system-provided rules) are implemented on server 106 and implemented using analysis module 170.

In some implementations, the query queue 112 stores one or more search queries awaiting analysis by the analysis module 170. In some implementations, the query queue 112 includes search queries for different types of electronic messages, such as a file transfer 111-$a$ (e.g., a photo, document, or video upload), an email 111-$b$, an instant message 111-$c$, a fax message 111-$d$, a social network update 111-$e$, or a voice message 111-$f$. In some implementations, the query queue 112 includes queries for message clusters, where a message cluster is one or more electronic messages having a collective association.

In some implementations, the collection of message presentation rules 114 include system and user-specified presentation rules. In some implementations, system-provided rules are determined by the message presentation system 106 (e.g., default message presentation rules), and user-specified rules are customized (e.g., added, removed, or modified) by a user.

In some implementations, a rule customization module 118 enables a user to customize (e.g., add, remove, and modify) message presentation rules within the collection of message presentation rules 114. These approaches enable customizing message presentation results to a user's specific needs.

Figure 2A:
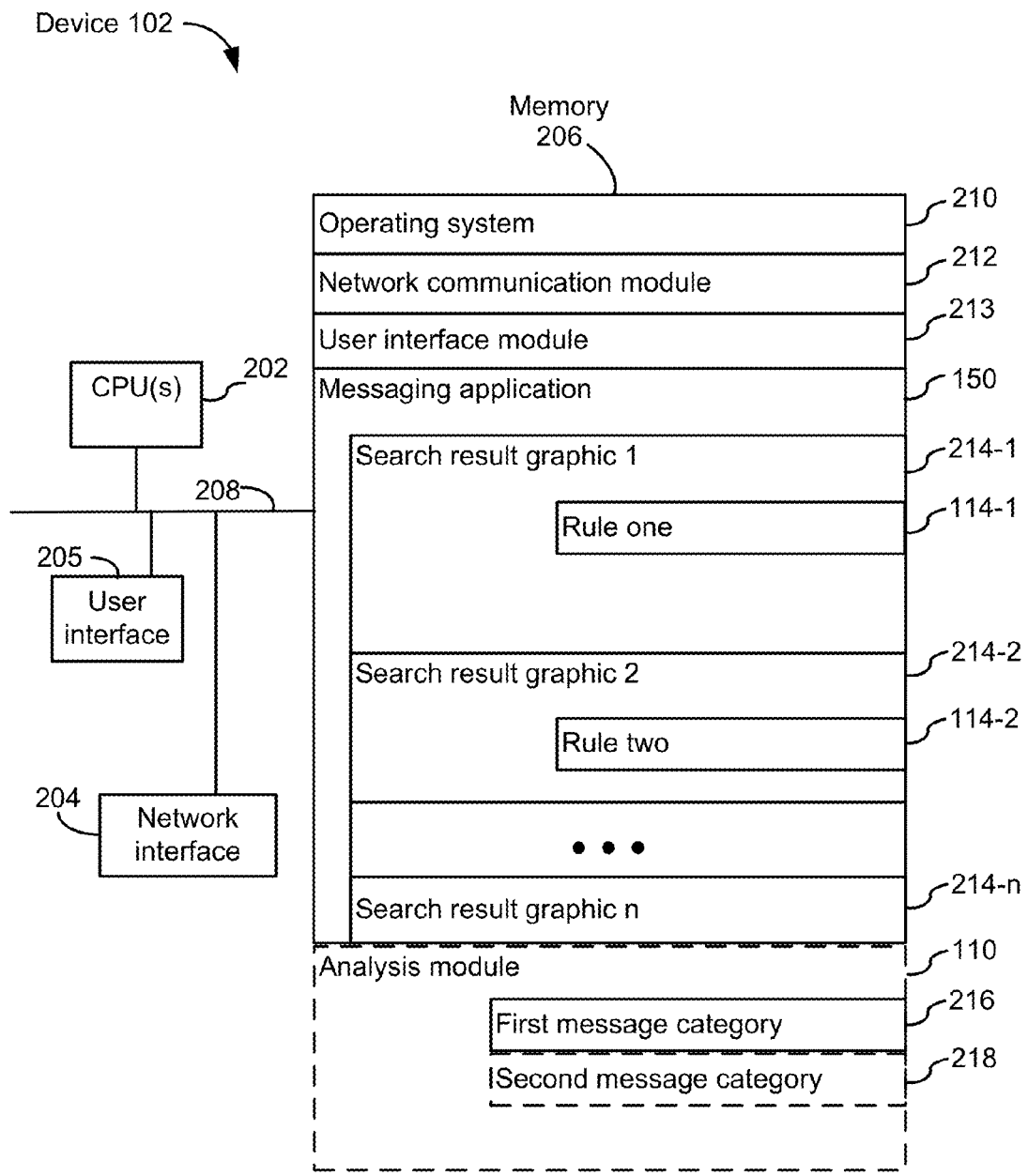
FIGS. 2A-2B are example block diagrams illustrating a computing device, and a message presentation system, in accordance with some implementations.

FIG. 2A is a block diagram illustrating a computing device 102, in accordance with some implementations. The device 102 in some implementations includes one or more processing units CPU(s) 202 (also referred to as processors), one or more network interfaces 204, a user interface 205, a memory 206, and one or more communication buses 208 for interconnecting these components. The communication buses 208 optionally include circuitry (sometimes called a chipset) that interconnects and controls communications between system components. The memory 206 typically includes high-speed random access memory, such as DRAM, SRAM, DDR RAM or other random access solid state memory devices and optionally includes non-volatile memory, such as one or more magnetic disk storage devices, optical disk storage devices, flash memory devices, or other non-volatile solid state storage devices. The memory 206 optionally includes one or more storage devices remotely located from the CPU(s) 202. The memory 206, or alternatively the non-volatile memory device(s) within the memory 206, comprises a non-transitory computer readable storage medium. In some implementations, the memory 206 or alternatively the non-transitory computer readable storage medium stores the following programs, modules and data structures, or a subset thereof:
- an operating system 210, which includes procedures for handling various basic system services and for performing hardware dependent tasks;
- a network communication module (or instructions) 212 for connecting the device 102 with other devices (e.g., the clustering system 106 and the devices 102B . . . 102N) via one or more network interfaces 204 (wired or wireless), or the communication network 104 (FIG. 1);
- a user interface module 213 for displaying user interface components or controls (e.g., textbox, button, radio button, drop-down list) to a user;
- a messaging application 150 for processing and displaying incoming and outgoing electronic messages, e.g., using search result graphics, including:
  - a search result graphic 1 (214-1) that visually displays one or more corresponding messages according to message presentation Rule One 114-1—which has been assigned to the message category corresponding to search result graphic 1;
  - a search result graphic 2 (214-2) that visually displays one or more corresponding messages according to message presentation Rule Two 114-2—which has been assigned to the message category corresponding to search result graphic 2; and
  - a search result graphic n (214-$n$) that visually displays one or more corresponding messages according to one or more message presentation rules that have been assigned to search result graphic n;
- optionally an analysis module 110 for analyzing search queries, message categories (e.g., first message category 216 and second message category 218) and message presentation rules, and generating display of one or more search results in accordance with therewith.

In some implementations, the user interface 205 includes an input device (e.g., a keyboard, a mouse, a touchpad, a track pad, and a touch screen) for a user to interact with the device 102.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 206 optionally stores a subset of the modules and data structures identified above. Furthermore, the memory 206 may store additional modules and data structures not described above.

Figure 2B:
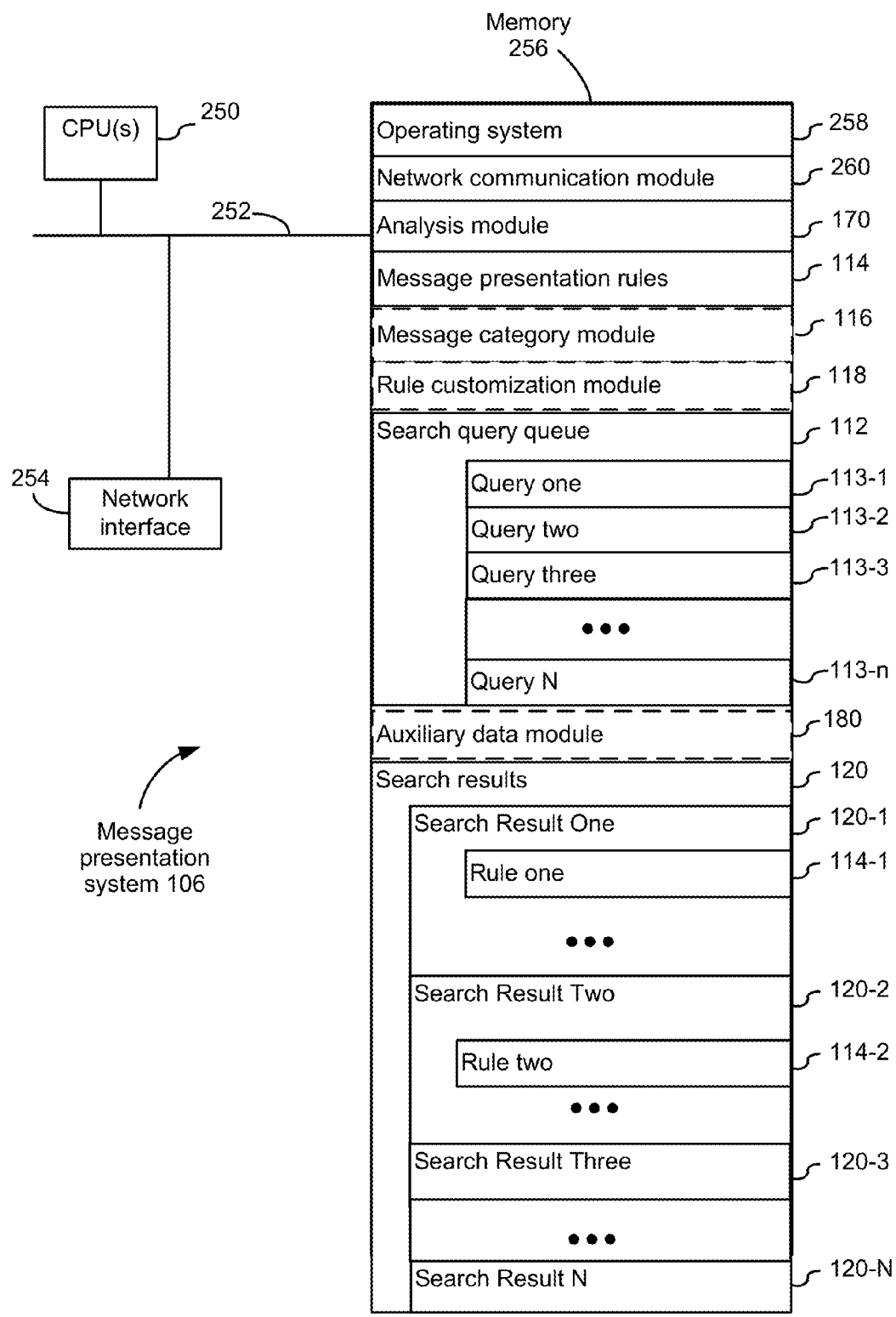

FIG. 2B is a block diagram illustrating a message presentation system 106, in accordance with some implementations. The message presentation system 106 typically includes one or more processing units CPU(s) 250 (also referred to as processors), one or more network interfaces 254, memory 256, and one or more communication buses 252 for interconnecting these components. The communication buses 252 optionally include circuitry (sometimes called a chipset) that interconnects and controls communications between system components. The memory 256 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 256 optionally includes one or more storage devices remotely located from CPU(s) 250. The memory 256, or alternatively the non-volatile memory device(s) within the memory 256, comprises a non-transitory computer readable storage medium. In some implementations, the memory 256 or alternatively the non-transitory computer readable storage medium stores the following programs, modules and data structures, or a subset thereof:

- an operating system 258, which includes procedures for handling various basic system services and for performing hardware dependent tasks;
- a network communication module (or instructions) 260 for connecting the message presentation system 106 with other devices (e.g., the devices 102) via the one or more network interfaces 254 (wired or wireless), or the communication network 104 (FIG. 1);
- an analysis module 170 for conducting a content-based analysis on incoming search queries, assigning electronic messages to one or more search results in accordance with the content based analysis (e.g., content categories), and assigning one or more message presentations rules to the search results in accordance with the content-based analysis (e.g., content categories);
- a search query queue 112 for storing search queries awaiting processing by the analysis module 170 (e.g., Query One 113-1, Query Two 113-2);
- a collection of message presentation rules 114, which specify how messages in associated categories are to be formatted for display;
- optionally a message category module 116 for updating and storing message categories and display information for some or all of the electronic messages
- optionally a rule customization module 118 for enabling a user to customize (e.g., add, remove, and modify) the collection of message presentation rules 114;
- optionally auxiliary data module 180 which, in some embodiments, provides additional data for display with certain electronic messages in some search results in accordance with the collections of message presentation rules 114 (the electronic message display formats) associated with the categories of these certain electronic messages;
- one or more search results 120 with corresponding message presentation rules assigned thereto, which include, for example:
  - search result 1 120-1 including:
    - Rule one 114-1;
  - search result 2 120-2 including:
    - Rule two 114-2;
  - search result 3 120-3; and
  - search result N 120-N.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 256 optionally stores a subset of the modules and data structures identified above. Furthermore, the memory 256 may store additional modules and data structures not described above.

Although FIGS. 2A and 2B show a "device 102" and a "message presentation system 106," respectively, FIGS. 2A and 2B are intended more as functional description of the various features which may be present in computer systems than as a structural schematic of the implementations described herein. In practice, and as recognized by those of ordinary skill in the art, items shown separately could be combined and some items could be separated.

Figure 3A:
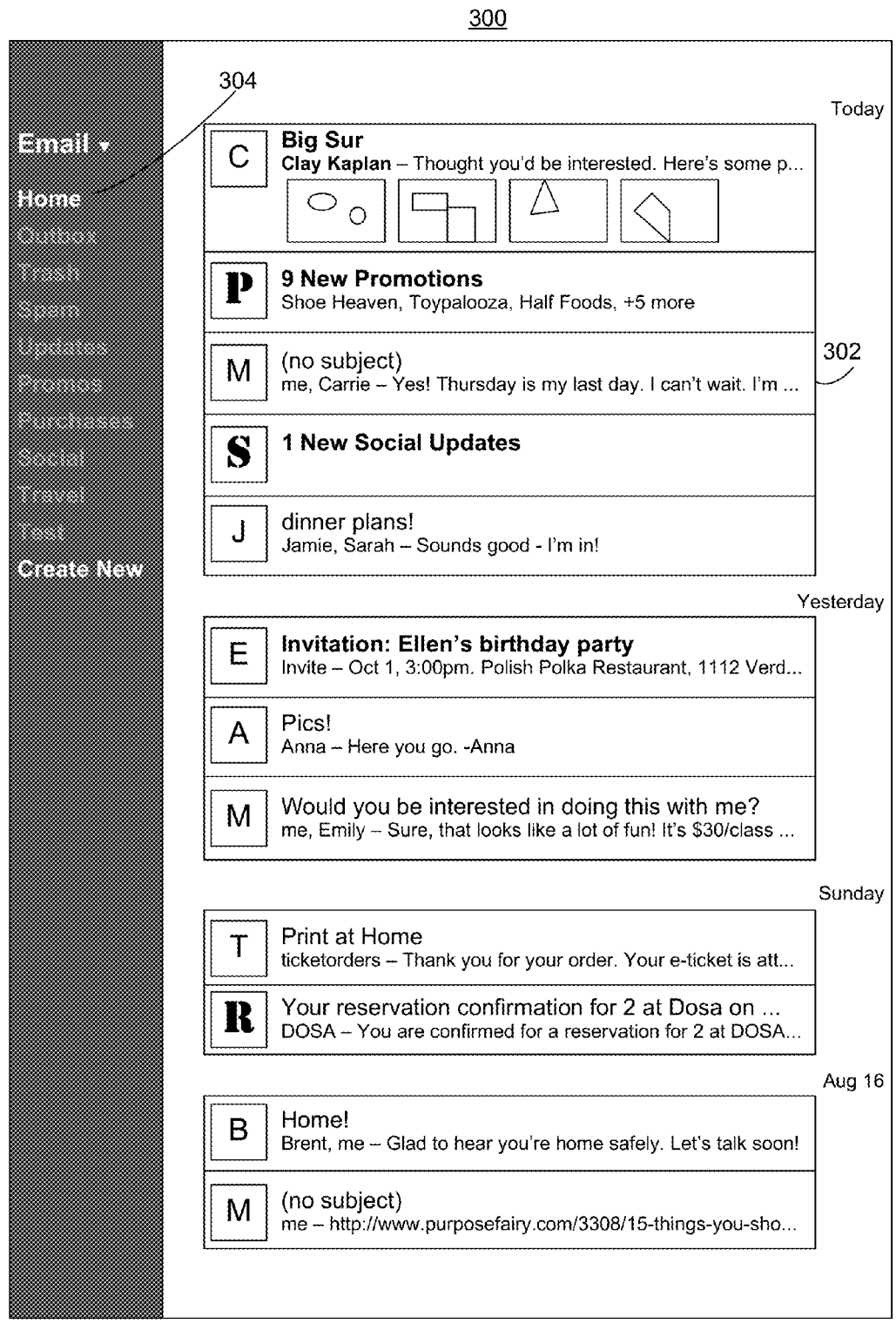
FIGS. 3A-3H illustrate example user interfaces depicting custom electronic message presentation, in accordance with some implementations.

FIGS. 3A-3H illustrate examples of search queries and category-based message presentation, in accordance with some implementations. In FIG. 3A, a user interface 300 is shown for an email application, comprising a listing of electronic messages (e.g., in an email inbox). FIG. 3A illustrates one example of a user selection of a search category, namely selection of the "Home" category 304 of messages in the email application. In some embodiments, the "Home" category 304 or another category of messages is the default selection for the email application. FIG. 3A illustrates a first format of display for messages (e.g., display of message 302), corresponding to selection of the "Home" message category 304. In other words, FIG. 3A illustrates receiving a search query identifying a first message category (the "Home" message category) from among a plurality of message categories ("Home", "Trash," "Spam," "Updates," "Promos," "Purchases," "Social," "Travel," and "Test") each respective message category in the plurality of message categories corresponding to an electronic message display format in a plurality of electronic message display formats. There is identified, responsive to the search query, a search result (e.g. electronic message 302 and the other electronic messages illustrated in FIG. 3A), the search result comprising one or more electronic messages that satisfy the search query. Further, the one or more electronic messages are prepared for display. This preparation comprises formatting for display a first electronic message (message 302) in the one or more electronic messages, where the first electronic message is associated with the first message category, using the electronic message display format that corresponds to the first message category.

Figure 3B:
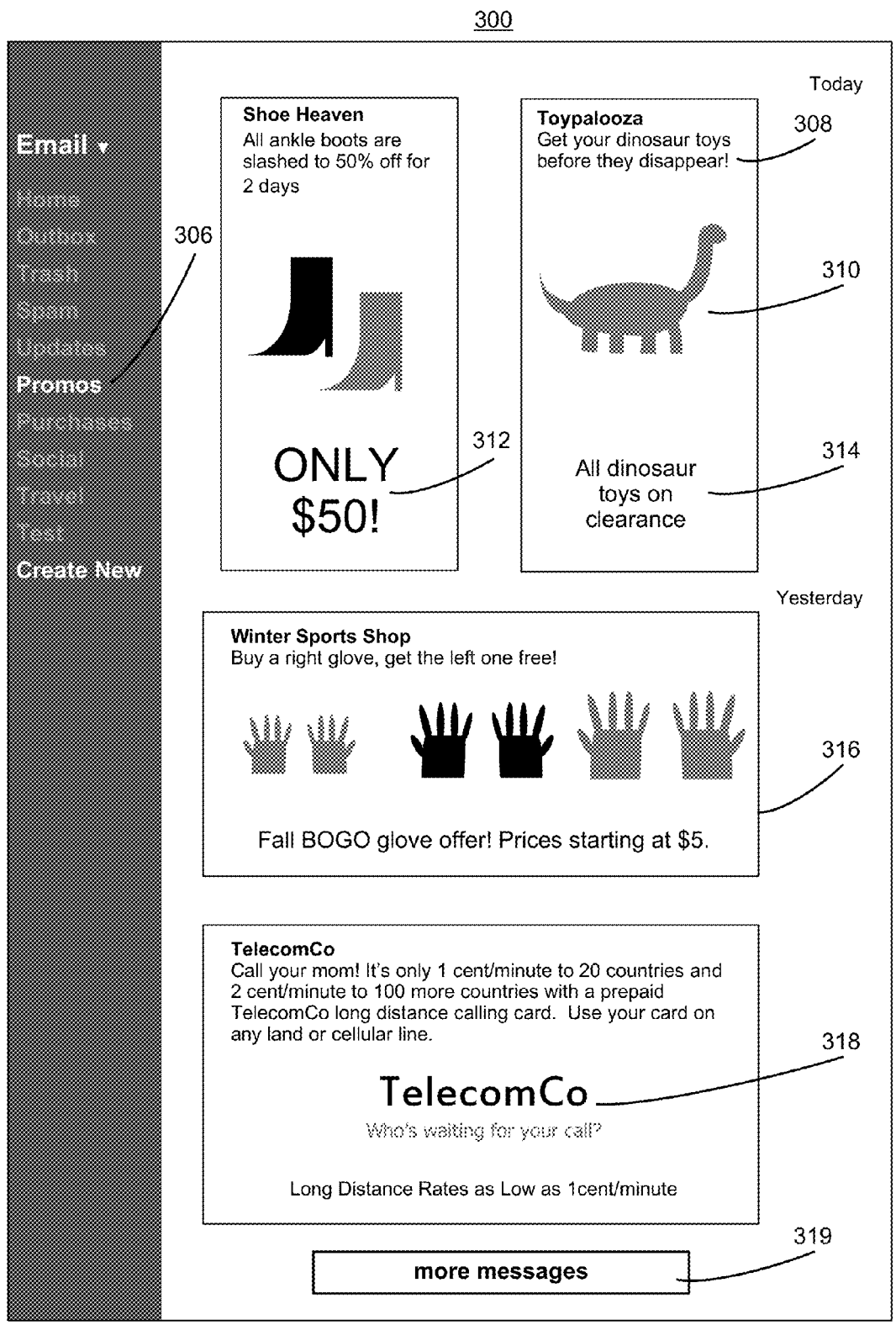

FIG. 3B illustrates an example of user selection of a "Promos" or promotional message category 306. In FIG. 3B, a second format of display for messages (e.g., message 316) corresponding to the "Promos" category 306 is shown. In this display format, in some embodiments, messages are displayed with images (e.g., image 310) to better illustrate the content of the respective messages. For example, the message for the store "Toypalooza" shows an image of a dinosaur 310, because the message is advertising a sale on all dinosaur toys. In some embodiments, the corresponding message image 310 is embedded in the content of the message. In some embodiments, the corresponding message image 310 is obtained from another source, such as an external server, or loaded from a website. In some embodiments, referring to FIG. 2B, the corresponding message image 310 is obtained from auxiliary data module 180 of message presentation system 106. In some embodiments, a respective message in this category does not have an image to display. In some embodiments, a respective message in this category displays an enlarged logo 318 in place of an image, to illustrate the brand or company name, rather than the actual product sold (e.g., TelecomCo logo 318 rather than depicting an image for long distance calling).

FIG. 3B also illustrates that in some embodiments, the respective electronic messages shown in this message category have text 308 associated with the message. In some embodiments, the text of a respective electronic message is truncated in a respective display format, if there is not enough space to show the entirety of the text. In some embodiments, a respective display format (e.g., the second display format) limits the number of messages displayed on the user interface 300 at any given time. In some embodiments, an affordance 319 is provided to enable a user to see more electronic messages in the search result.

FIG. 3B also illustrates that in a display format for a "Promotional" search result category, one or more displayed messages display a corresponding price or cost for a product being advertised in the message. For example, in the message from "Shoe Heaven," ankle boots are advertised, along with a corresponding price 312 of $50. In some embodiments, the price or cost of a product being advertised is determined from the content of the respective message. In some embodiments, the price/cost is determined from another source, such as a website or external server. In some embodiments, referring to FIG. 2B, the price or cost is obtained from auxiliary data module 180 of message presentation system 106. In some embodiments, a price or cost in dollars is not determined from either the content of the message or another source. In some of these embodiments, another price-related message, such as message 314, can be used in place of the actual price of the products being advertised in the respective message.

Figure 3C:
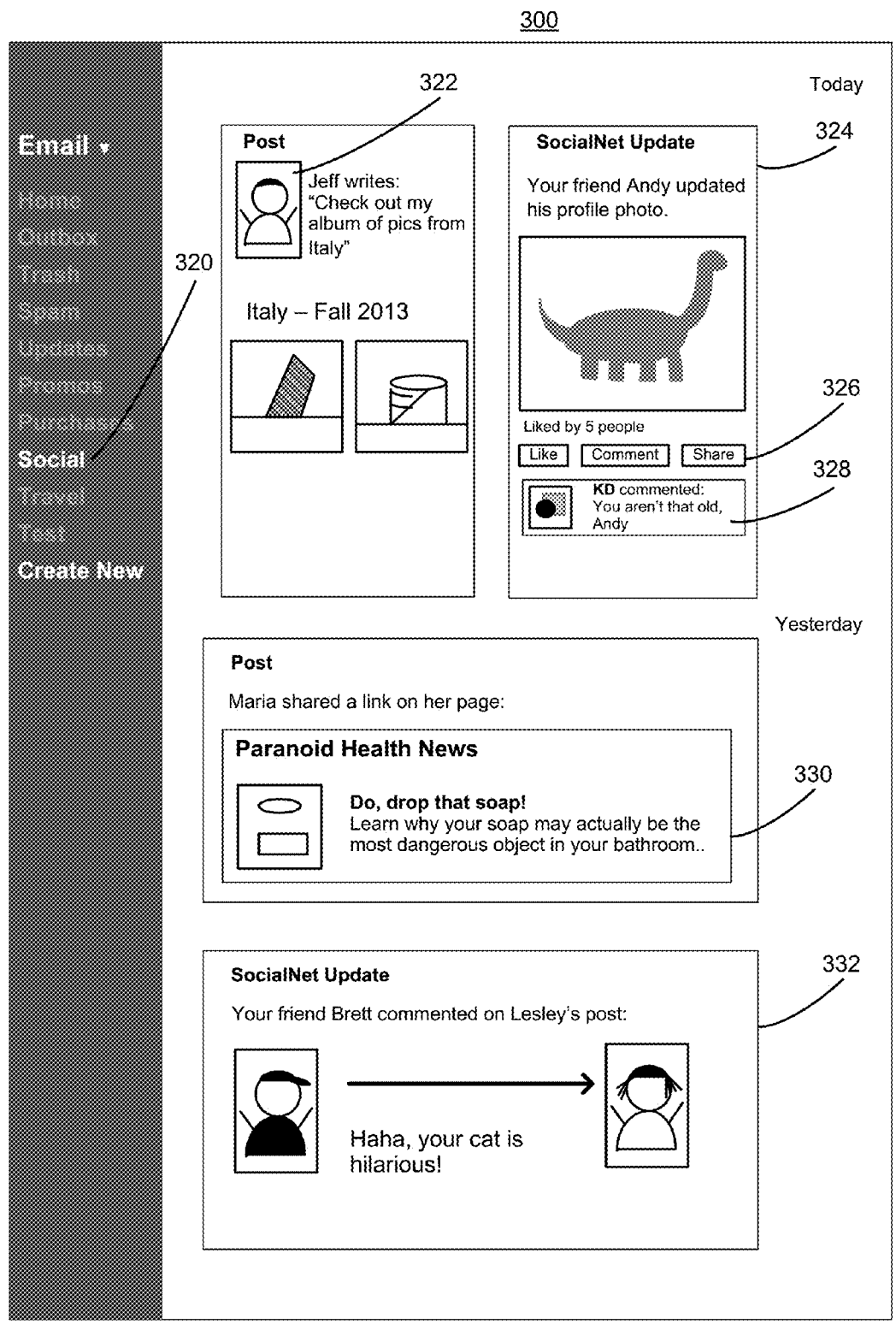

FIG. 3C illustrates an example of user selection of a "Social" or social network message category 320. In FIG. 3C, a third format of display for messages (e.g., message 324) corresponding to the "Social" category 320 is shown. In this display format, in some embodiments, messages are displayed with images corresponding to the person generating the message (e.g., profile image 322) to better illustrate the source of the respective messages. For example, the message for the post by Jeff shows a profile photo of Jeff to quickly illustrate social network content generated by Jeff. In some embodiments, the corresponding user image 322 is embedded in the content of the message. In some embodiments, the corresponding user image 322 is obtained from another source, such as an external server, or loaded from a website. In some embodiments, referring to FIG. 2B, the corresponding user image 322 is obtained from auxiliary data module 180 of message presentation system 106.

FIG. 3C also illustrates a variety of types of messages that are displayed in a third display format. The third display format corresponding to the "Social" category 320, comprises updates 324, posts, shared links 330, photo albums and comments 332 and 328 by friends in one or more social networks that the user of the email application has subscribed to. In some embodiments, a respective message (e.g., 324) displayed in the third display format shows the content of the social network post or update (e.g., Andy updated his profile photo), along with interactive elements such as affordances to like, comment or share 326 the corresponding social network message. In some embodiments, the respective message also shows comments, shares or likes by other users (e.g., comment 328).

Figure 3D:
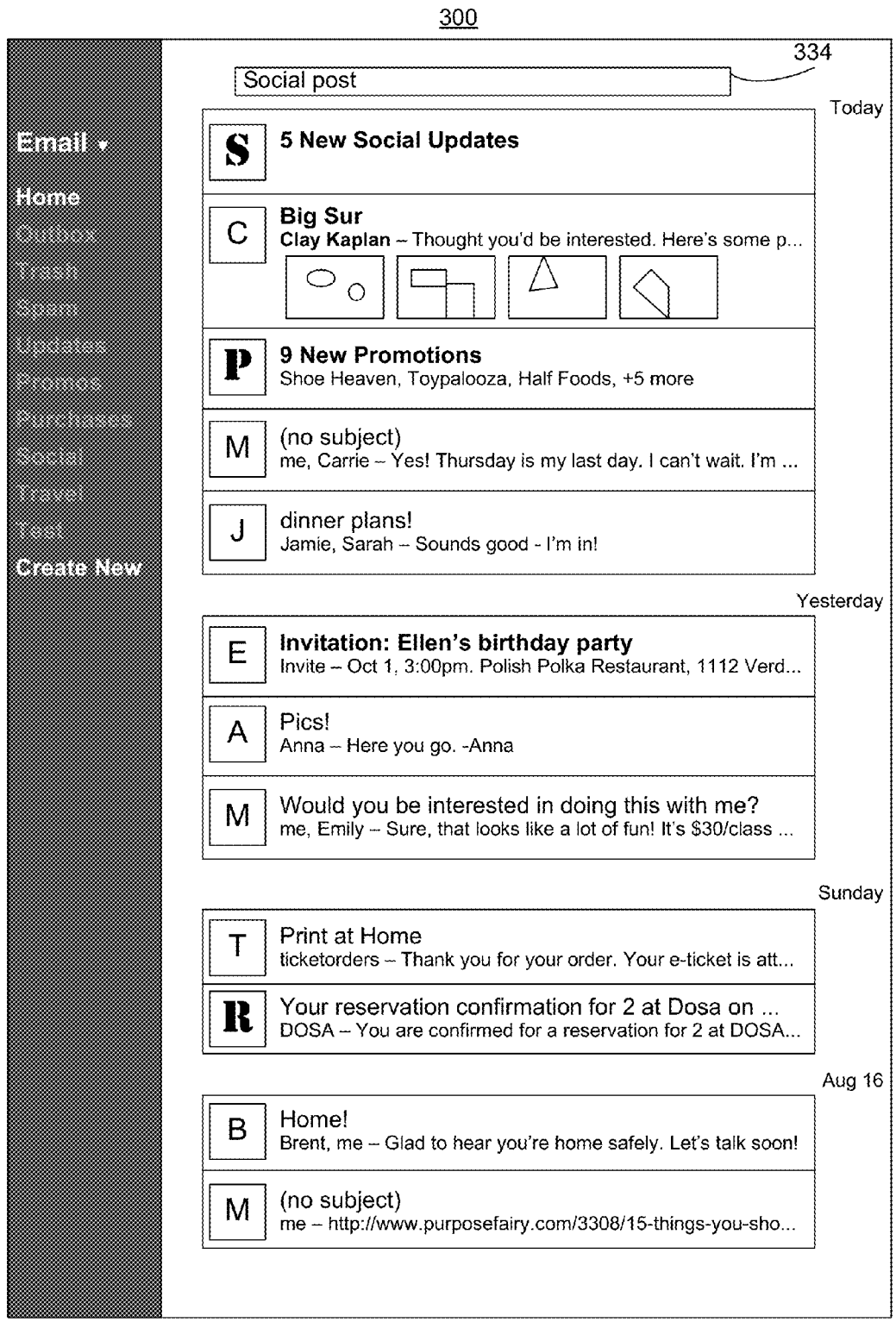
Figure 3E:
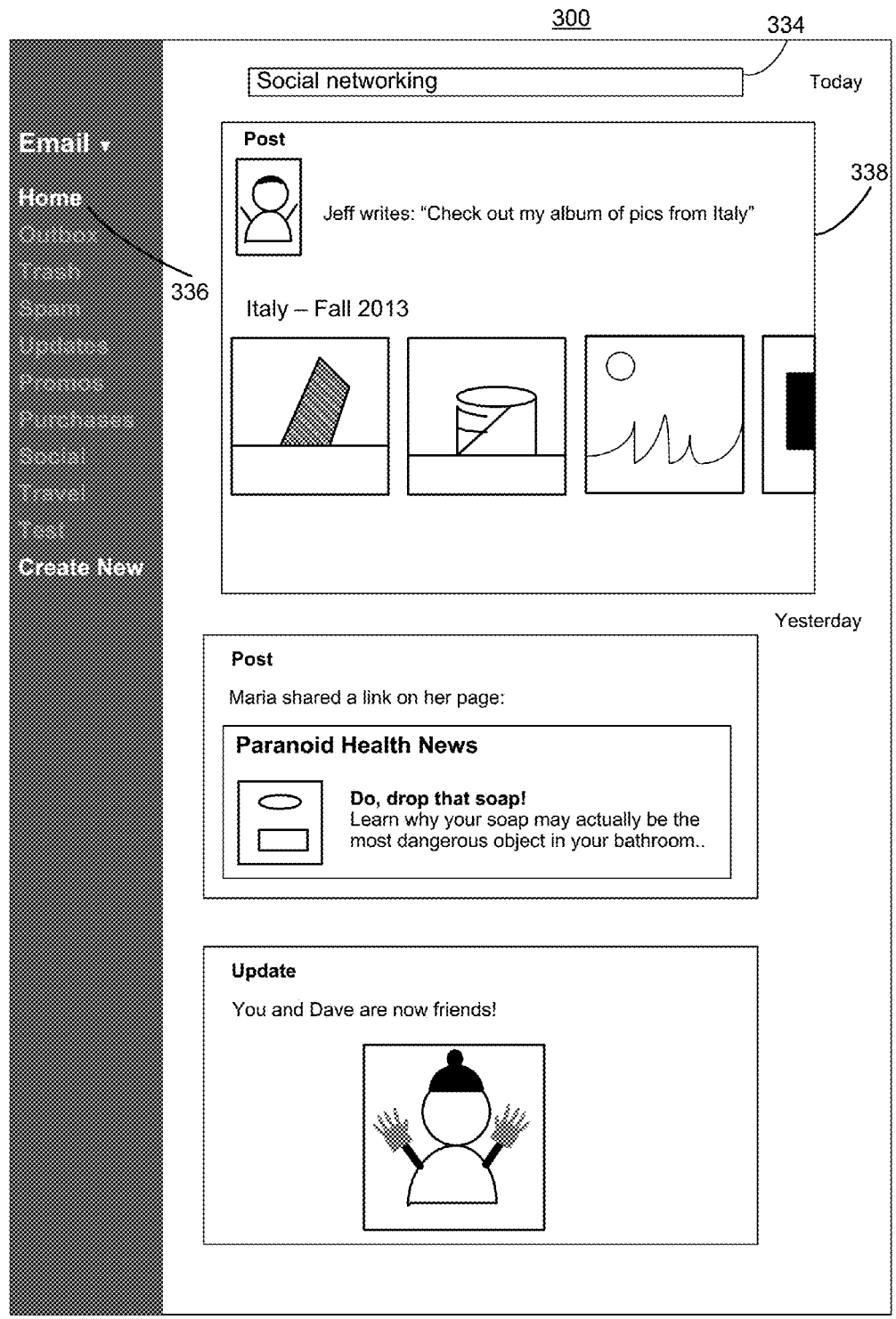

FIG. 3D illustrates another form of entering a search query in the user interface 300, namely through a search bar entry 334. In this example, the user has entered text to search for messages associated with a social networking site. In FIG. 3E, it is shown that the search results for the search are displayed, namely several social network messages (e.g., message 338). In some embodiments, it is recognized that one or more keywords in a search expression correspond to one or more existing message categories. In some embodiments, recognizing that one or more keywords in the search expression correspond to at least one existing message category results in formatting display of the search results in accordance with the message presentation rules of that at least one message category (e.g., the social networking search results are displayed in a very similar fashion to the "Social" search results in FIG. 3C). In some embodiments, the results will be displayed such that the first message of a set of search results (e.g., message 338) will be displayed larger than other messages in the search results. In some embodiments, a keyword search 334 will not result in a change of category in a menu (e.g., Home 336) of the user interface 300.

Figure 3F:
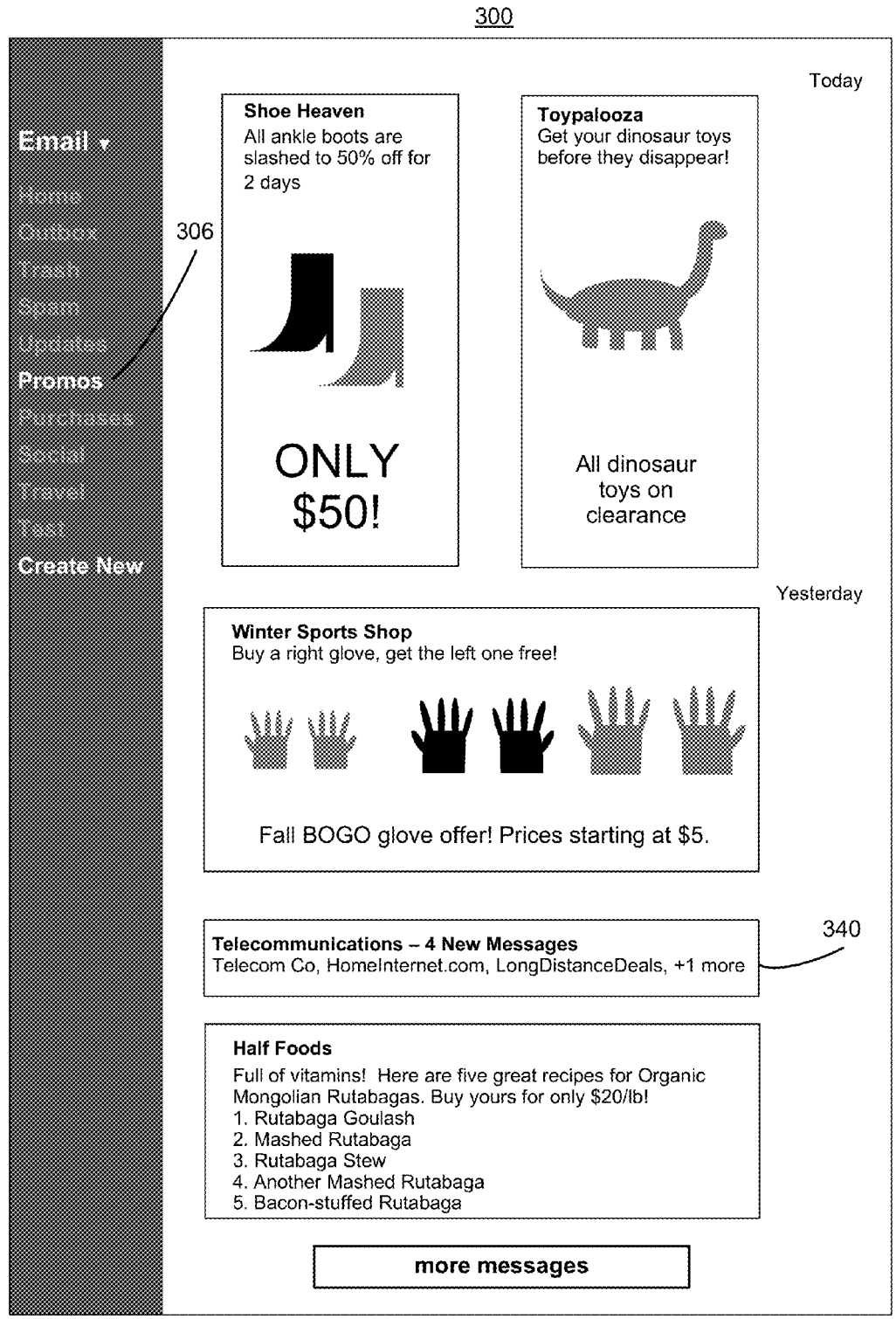

FIG. 3F illustrates that in some embodiments, one or more of the search results is a message cluster that is displayed as a single cluster graphic. For example, upon user search query of "Promos" 306, a set of search results are shown, including Telecommunications message cluster 340. In some embodiments, a message cluster comprises more than one message. In such embodiments, a single message cluster graphic (e.g., graphic 340) representing the message cluster is displayed in the search results in a condensed fashion (as shown in FIG. 3F), such that the contents of the cluster cannot be completely viewed upon initial display of the search results. In some embodiments, responsive to a predefined user action in connection with the single cluster graphic, display of the single cluster graphic is expanded, by, while maintaining display of information representing the electronic messages in the message cluster, formatting for display content of a respective electronic message in the cluster in accordance with the display format that corresponds to the message category of the respective electronic message. For example, in response to the predefined user action (e.g., clicking on graphic 340) one of the four new messages relating to "Telecommunication" will be displayed in an expanded format in accordance with the electronic message display format of the new message as illustrated in FIG. 3H and as further described below.

Clusters are described in U.S. patent application Ser. No. 14/139,205, filed Dec. 23, 2013, entitled "Systems and Methods for Clustering Electronic Messages," which is hereby incorporated by reference herein in its entirety. Whereas conversations aggregate electronic messages based on content relatedness (e.g., header content relatedness) between messages already in the conversations and messages being considered for assignment to conversations, electronic messages are organized into clusters without regard to content relatedness between messages within the clusters and messages being considered for assignment to the clusters. For example, a string of messages from and to a first and second user or group of users are good candidates for inclusion in a conversation because of the content relatedness between the messages in the conversations and the messages being considered for the conversations. However, absent some additional criterion or factor, the relatedness in the source and destination of these messages does not serve as a basis for inclusion in the same cluster.

Figure 3G:
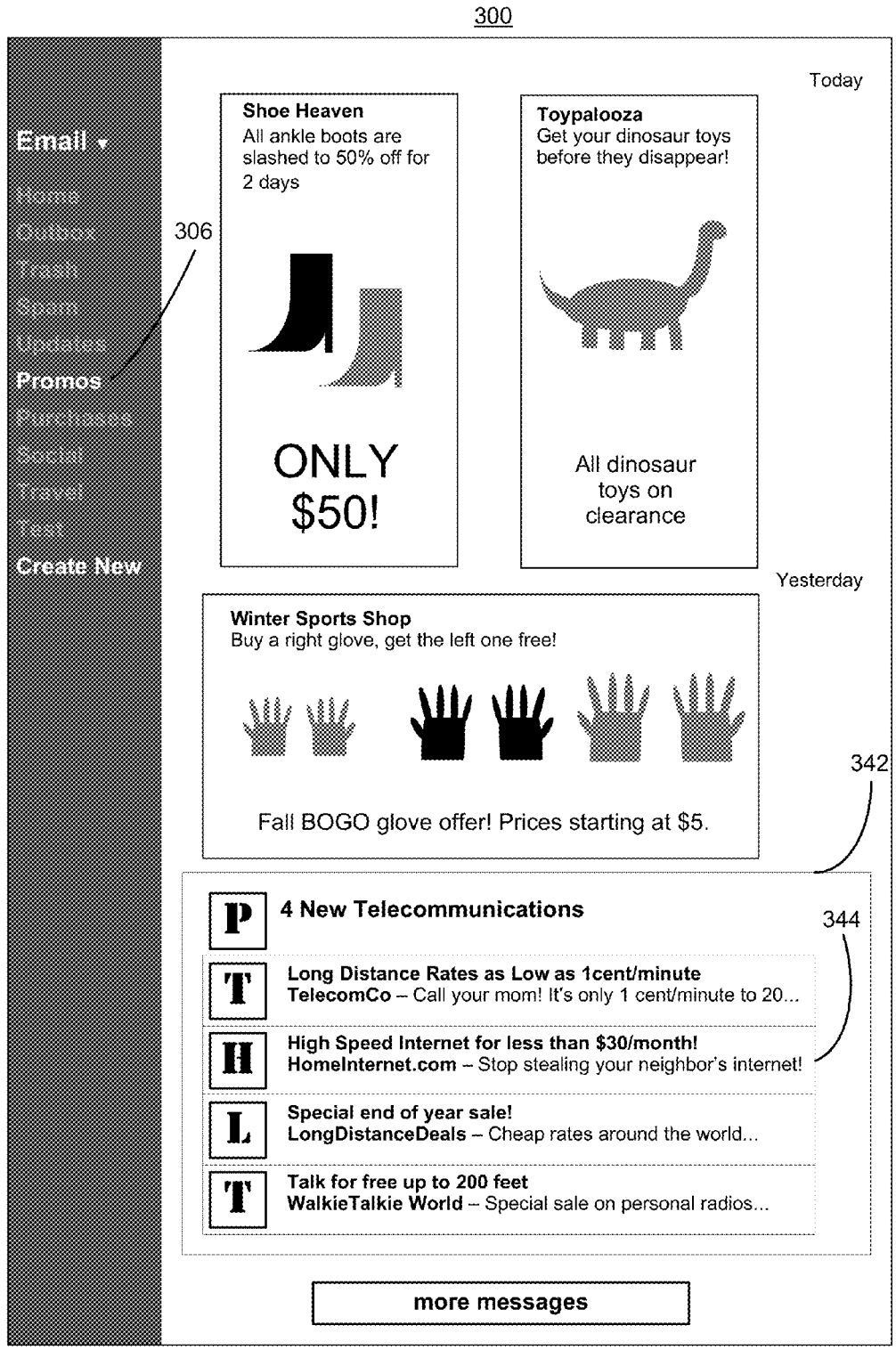

FIG. 3G illustrates an alternate view of a message cluster in a set of search results. In some embodiments, a message cluster comprises more than one electronic message (e.g., message 344). In some embodiments, message cluster 342 is displayed in response to detecting a user input on another view of a message cluster, such as message cluster 340 in FIG. 3F, in order to view the contents of the respective message cluster. In some embodiments, viewing the contents of the message cluster 342, as in FIG. 3G, moves the other messages displayed in the set of search results (e.g., pushes other messages up or down on user interface 300). For example, in FIG. 3F, an electronic message search result is shown below message cluster 340, but in FIG. 3G that message cluster has been pushed "down" in the listing of search results in order to make room for message cluster 342 to be displayed. In some embodiments, viewing the contents of the message cluster 342, as in FIG. 3G, resizes or enlarges the message cluster 342 within the listing of electronic messages in user interface 300.

Figure 3H:
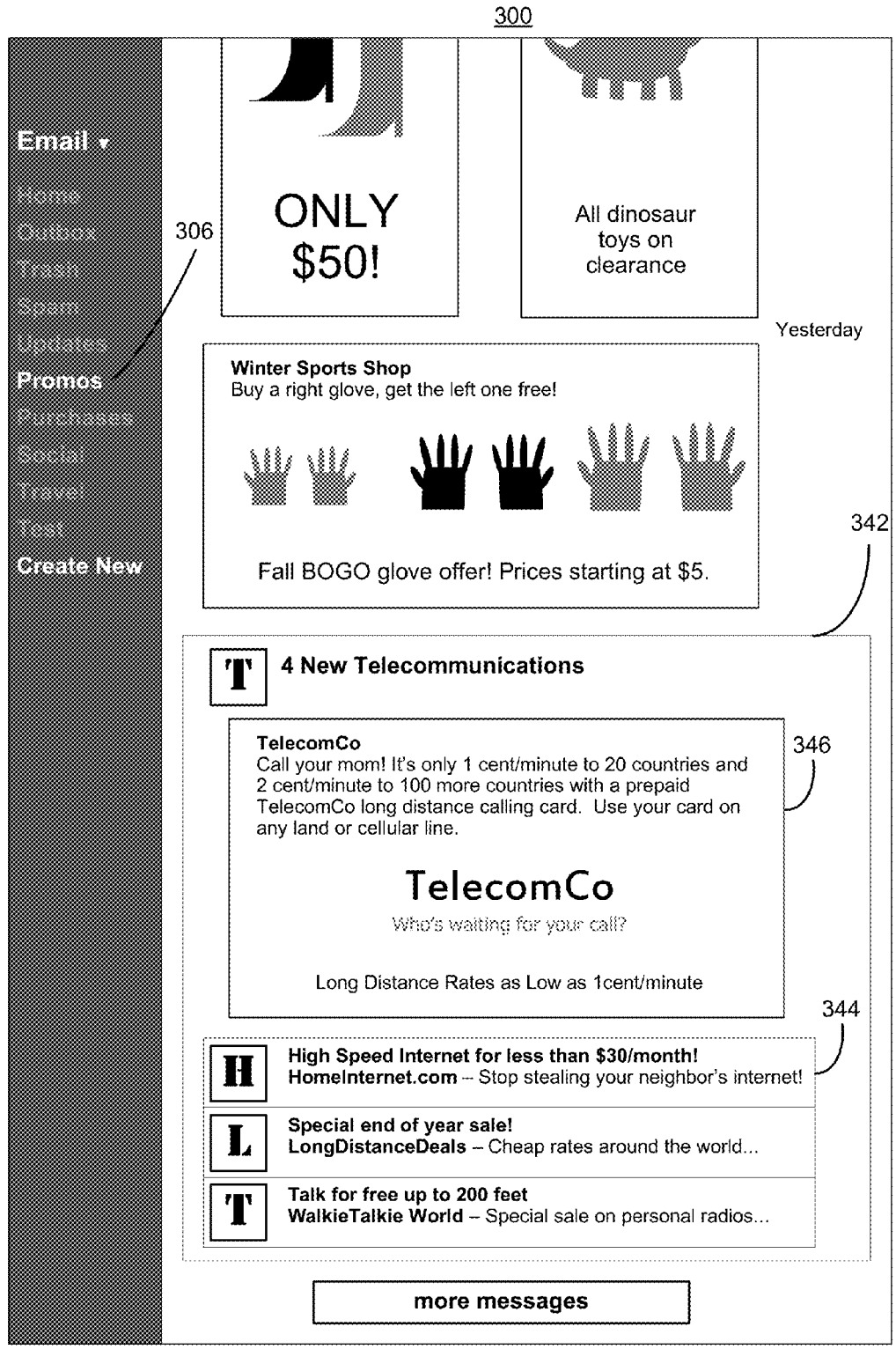

FIG. 3H illustrates display of a first electronic message 346 within a message cluster 342. In some embodiments, viewing the contents of the first electronic message 346 within message cluster 342, as in FIG. 3H, moves the other messages displayed in the set of search results (e.g., pushes other messages up or down on user interface 300).

Figure 4A:
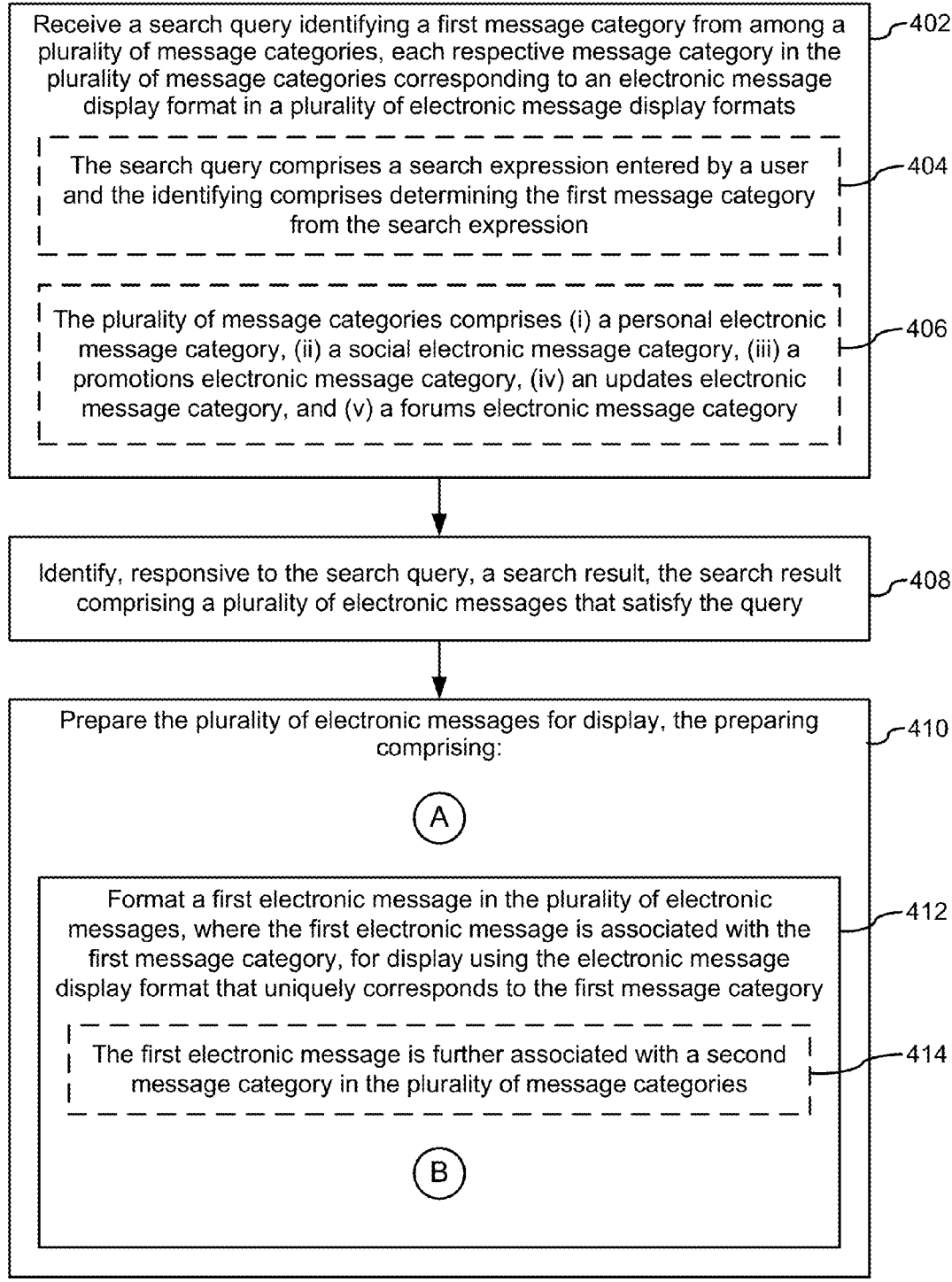
FIGS. 4A-4C are flow charts illustrating an example method for custom electronic message presentation in a computing system, in accordance with some implementations.
Figure 4B:
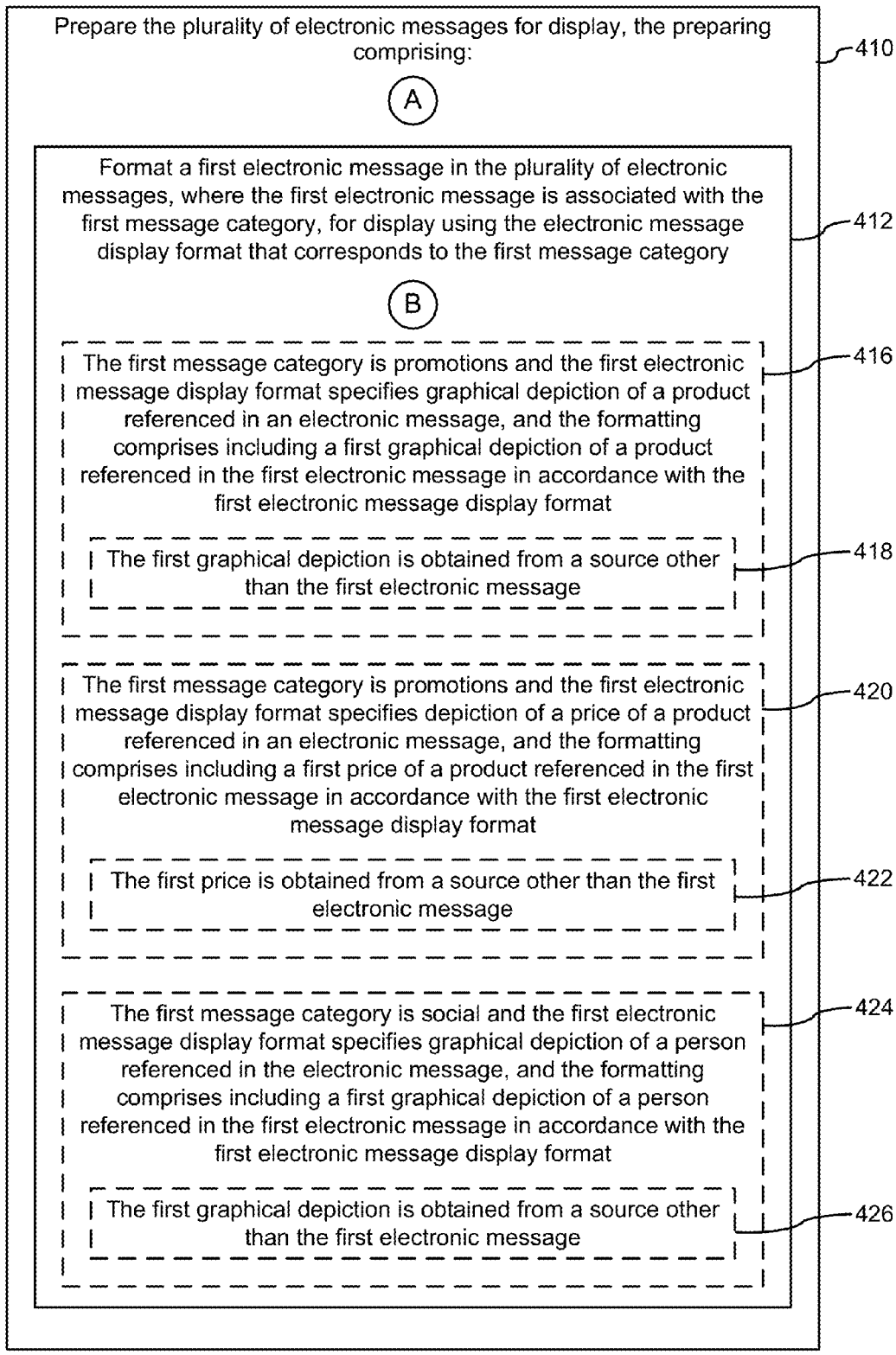
Figure 4C:
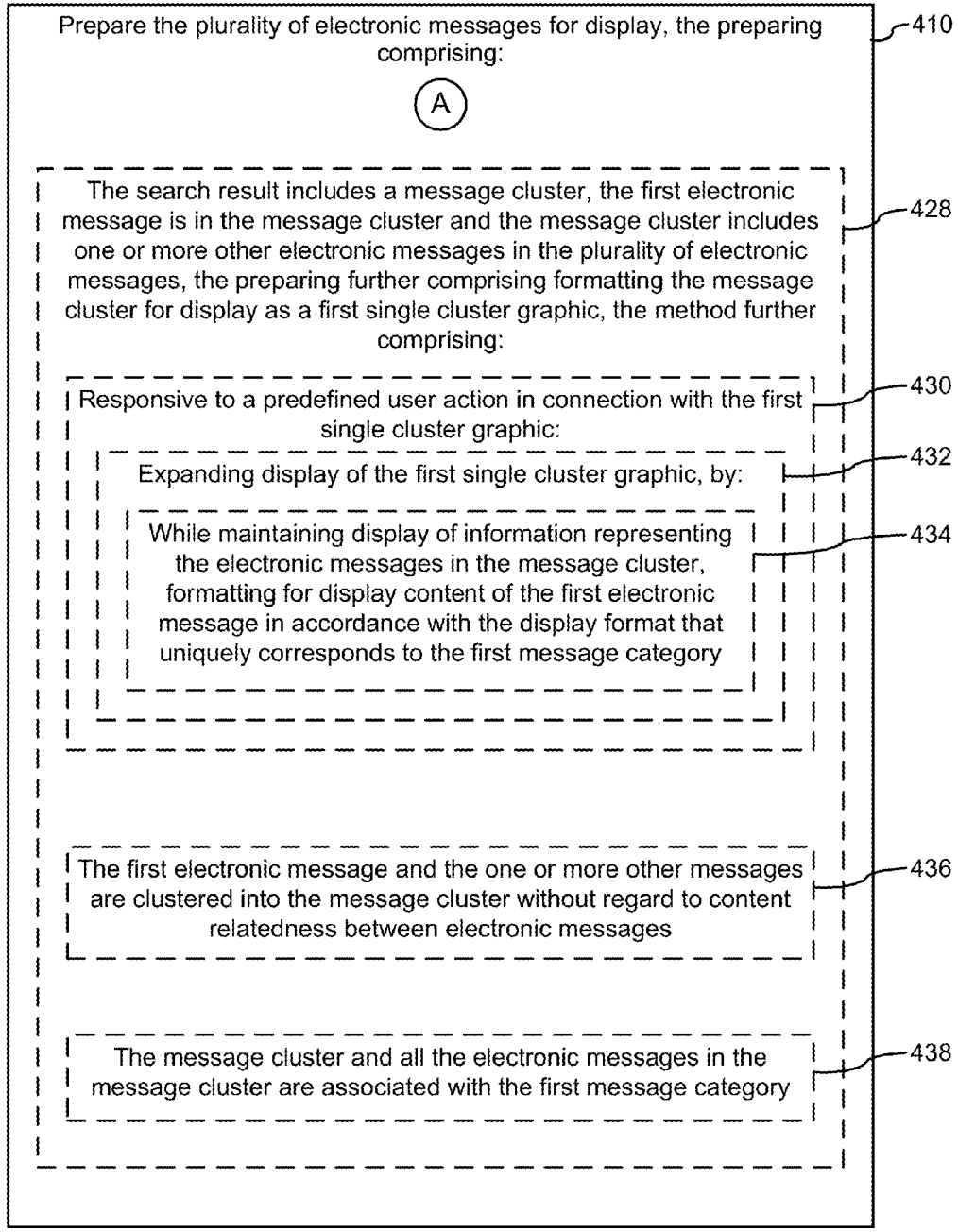

FIGS. 4A-4C illustrate a flow chart for a method 400 of presenting electronic messages. The method comprises receiving (402) a search query, where the search query optionally identifies a first message category from among a plurality of message categories (e.g., picking a message category or entering a keyword search from which the message category can be discerned). Each respective message category in the plurality of message categories corresponds to an electronic message display format in a plurality of electronic message display formats. In some embodiments, the search query comprises (404) a search expression entered by a user and the identifying comprises determining the first message category from the search expression. In some embodiments, the search query comprises (404) a search expression entered by a user and the first message category is not identified from the search expression but rather from the electronic messages that are deemed to satisfy the search query. In some embodiments, the plurality of message categories comprises (406) (i) a personal electronic message category, (ii) a social electronic message category, (iii) a promotions electronic message category, (iv) an updates electronic message category, and (v) a forums electronic message category.

The method further includes identifying (408), responsive to the search query, a search result, the search result comprising a plurality of electronic messages that are deemed to satisfy the query (e.g. the plurality of search results shown in FIG. 3C for a "Social network" category). The method further includes preparing (410) the plurality of electronic messages for display, the preparing comprising formatting (412) a first electronic message in the plurality of electronic messages, where the first electronic message is associated with the first message category, for display using the electronic message display format that corresponds to the first message category. In some embodiments, the first electronic message is (414) further associated with a second message category in the plurality of message categories.

In some embodiments, the first electronic message is further associated with a second message category in the plurality of message categories but the electronic display format associated with the first message category is used to format the first electronic message because the first message category was specified by the search query. In some embodiments, the first electronic message is further associated with a second message category in the plurality of message categories, the search query does not specify a message category, and the electronic display format associated with the first message category is used to format the first electronic message rather than the electronic display format associated with the second message category because the first message category has hierarchical priority over the second message category.

In some embodiments, the first message category is (416) promotions and the first electronic message display format specifies graphical depiction of a product referenced in an electronic message, and the formatting comprises including a first graphical depiction of a product referenced in the first electronic message in accordance with the first electronic message display format. In some embodiments, the first graphical depiction is obtained (418) from a source other than the first electronic message.

In some embodiments, the first message category is (420) promotions and the first electronic message display format specifies the depiction of a price of a product referenced in an electronic message, and the formatting comprises including a first price of a product referenced in the first electronic message in accordance with the first electronic message display format. In some embodiments, the first price is obtained (422) from a source other than the first electronic message.

In some embodiments, the first message category is (424) social and the first electronic message display format specifies graphical depiction of a person referenced in the electronic message, and the formatting comprises including a first graphical depiction of a person referenced in the first electronic message in accordance with the first electronic message display format. In some embodiments, the first graphical depiction is obtained (426) from a source other than the first electronic message.

In some embodiments, the search result includes (428) a message cluster, the first electronic message is in the message cluster and the message cluster includes one or more other electronic messages in the plurality of electronic messages, the preparing further comprises formatting the message cluster for display as a first single cluster graphic. In some embodiments, the method further comprises, responsive (430) to a predefined user action in connection with the first single cluster graphic, expanding (432) display of the first single cluster graphic by, while maintaining display of information representing the electronic messages in the message cluster, formatting (434) for display content of the first electronic message in accordance with the display format that corresponds to the first message category.

In some embodiments, the first electronic message and the one or more other messages are clustered (436) into the message cluster without regard to content relatedness between electronic messages. In some embodiments, the message cluster and all the electronic messages in the message cluster are (438) associated with the first message category.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first message category could be termed a second message category, and, similarly, a second message category could be termed a first message category, without changing the meaning of the description, so long as all occurrences of the "first message category" are renamed consistently and all occurrences of the "second message category" are renamed consistently. The first message category and the second message category are both message categories, but they are not the same message category.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed:

1. A method comprising:
at a computer system having one or more processors, and memory storing one or more programs for execution by the one or more processors:
identifying a plurality of predefined message categories, each message category corresponding to a respective electronic message display format;
receiving a search query that identifies a first message category, the first message category corresponding to a first display format;
identifying one or more electronic messages that are assigned to the first message category, wherein the one or more electronic messages includes a first electronic message;
retrieving an image from a source external for the first electronic message according to the first display format and according to content of the first electronic message; and
formatting for display, according to the first display format, the first electronic message and the retrieved image, wherein the retrieved image is included in the display of the first electronic message.

2. The method of claim 1, wherein the first message category defines a first message cluster and the method further comprises:
formatting the first message cluster for display as a first single cluster graphic; and
responsive to a predefined user action in connection with the first single cluster graphic:
expanding display of the first single cluster graphic, by:
while maintaining display of information representing the electronic messages in the first message cluster, formatting for display content of the first electronic message in accordance with the first electronic message display format.

3. The method of claim 1, wherein the first electronic message is further associated with a second message category in the plurality of message categories.

4. The method of claim 1, wherein:
the first message category is promotions;
the first display format specifies, for each electronic message, using a graphical depiction of a respective product referenced in the respective electronic message; and
the retrieved image is a graphical depiction of a product referenced in the first electronic message.

5. The method of claim 1, wherein:
the first message category is promotions;
the first display format specifies, for each electronic message, using a depiction of a respective price of a respective product referenced in the respective electronic message; and
the formatting comprises including, in the display of the first electronic message, a first price of a product referenced in the first electronic message.

6. The method of claim 5, wherein the first price is obtained from a source external to the first electronic message.

7. The method of claim 1, wherein:
the first message category is social;
the first display format specifies, for each electronic message, using a graphical depiction of a respective person referenced in the respective electronic message; and
the retrieved image is a graphical depiction of a person referenced in the first electronic message.

8. The method of claim 1, wherein the plurality of message categories comprises one or more of (i) a personal electronic message category, (ii) a social electronic message category, (iii) a promotions electronic message category, (iv) an updates electronic message category, and (v) a forums electronic message category.

9. A computing device, comprising:
one or more processors;
memory; and
one or more programs, wherein the one or more programs are stored in the memory and are configured to be executed by the one or more processors, the one or more programs including instructions for:

identifying a plurality of predefined message categories, each message category corresponding to a respective electronic message display format;

receiving a search query that identifies a first message category, the first message category corresponding to a first display format;

identifying one or more electronic messages that are assigned to the first message category, wherein the one or more electronic messages includes a first electronic message;

retrieving an image from a source external for the first electronic message according to the first display format and according to content of the first electronic message; and formatting for display, according to the first display format, the first electronic message and the retrieved image, wherein the retrieved image is included in the display of the first electronic message.

10. The computing device of claim 9, wherein the first electronic message is further associated with a second message category in the plurality of message categories.

11. The computing device of claim 9, wherein:

the first message category is promotions;

the first electronic message display format specifies, for each electronic message, using a graphical depiction of a respective product referenced in the respective electronic message; and the retrieved image is a graphical depiction of a product referenced in the first electronic message.

12. A non-transitory computer readable storage medium storing one or more programs, the one or more programs comprising instructions, which when executed by a computing device with one or more processors, cause the computing device to execute a method of:

identifying a plurality of predefined message categories, each message category corresponding to a respective electronic message display format;

receiving a search query that identifies a first message category, the first message category corresponding to a first display format;

identifying one or more electronic messages that are assigned to the first message category, wherein the one or more electronic messages includes a first electronic message;

retrieving an image from a source external for the first electronic message according to the first display format and according to content of the first electronic message; and formatting for display, according to the first display format, the first electronic message and the retrieved image, wherein the retrieved image is included in the display of the first electronic message.

* * * * *